United States Patent [19]

Bentley

[11] Patent Number: 4,484,752
[45] Date of Patent: Nov. 27, 1984

[54] ROTATING-LIP BIDIRECTIONAL HYDRODYNAMIC OIL SEAL

[75] Inventor: Gustavus A. Bentley, Ann Arbor, Mich.

[73] Assignee: Federal-Mogul Corporation, Southfield, Mich.

[21] Appl. No.: 587,371

[22] Filed: Mar. 8, 1984

[51] Int. Cl.³ .......................... F16J 15/34; F16J 15/54
[52] U.S. Cl. .......................................... 277/25; 277/83; 277/84; 277/174; 277/177
[58] Field of Search ........................ 277/3, 25, 27, 134, 277/165, 173, 174, 177, 186, 83, 84

[56] References Cited

U.S. PATENT DOCUMENTS

| | | | |
|---|---|---|---|
| 2,418,707 | 4/1947 | Groot | 277/25 |
| 2,877,029 | 3/1959 | Peguet et al. | 277/84 X |
| 2,908,536 | 10/1959 | Dickey | 277/25 X |
| 3,536,332 | 10/1970 | Pitner | 277/84 X |
| 4,283,064 | 8/1981 | Staab et al. | 277/134 X |
| 4,348,031 | 9/1982 | Johnston | 277/25 X |

*Primary Examiner*—Robert S. Ward
*Attorney, Agent, or Firm*—Robert F. Hess

[57] ABSTRACT

A rotating-disc bidirectional hydrodynamic oil seal, for use between a shaft and a bore, one of which is stationary while the other rotates. A rigid member has a peripheral portion engaging the stationary member and has a frustoconical portion with a disc-engaging surface on one side, facing the shaft. A sealing assembly has a portion mounted on the rotating member and a flexible sealing disc that extends radially outwardly and tends to assume a substantially radial position. The disc has an outer edge and first and second opposite faces; the first face engages the disc-engaging surface of the wear sleeve which also flexes the disc. The oil reservoir is functionally in communication with the outer edge and the second face. Centrifugal force, in either direction of rotation urges the first face snugly against the disc-engaging surface and prevents passage of oil between the disc and the disc-engaging surface. If some oil does get beyond the disc, it is returned to the oil reservoir.

39 Claims, 21 Drawing Figures

ROTATING-LIP BIDIRECTIONAL HYDRODYNAMIC OIL SEAL

This invention relates to an improved rotating-lip bidirectional hydrodynamic oil seal.

BACKGROUND OF THE INVENTION

Oil seals have been in use for many years to prevent leakage from oil reservoirs and are interposed between a shaft and a housing, one of which rotates. The problem has been that even with an oil seal that theoretically should be perfect, there has been leakage due to imperfections of the shaft surface. For example, a scratch along the shaft can let oil leak out, under both static and rotating conditions. In some instances the scratches or imperfections are such as to increase leakage during rotating conditions.

To combat this, shaft seals with hydrodynamic action have been used. Some such seals exhibit the desired function in only one direction; for that one direction of shaft rotation they utilize such things as spiral grooves or flutes formed on the air side of an elastomeric sealing lip to return oil from the air side of the oil seal to and beyond the lip, back into the oil reservoir. Such oil seals are hydrodynamic in only one direction of rotation of the shaft, in the opposite direction they are either ineffectual or actually increase seal leakage.

However, in many installations it is difficult to predict which will be the direction of rotation relative to the seal,—for example, a rotating shaft with the same seal at each end, mounted symmetrically. Furthermore, some shafts rotate at times in one direction and at other times rotate in the opposite direction. For both these reasons oil seal manufacturers have devised various bidirectional hydrodynamic oil seals. Here again, the air side of the sealing element is provided with flutes or other effective configuration to act when the shaft or bore rotates in a manner such that rotation in either direction has the effect of returning to the oil reservoir oil that may have leaked past the lip.

Thus, in molded elastomeric seal elements, hydrodynamic action, whether unidirectional and bidirectional can be obtained by molding certain particular shapes on the air side of the lip. However, when seal materials such as polytetrafluoroethylene are used, molding is not easy and in the past has been costly. Hence, the normal polytetrafluoroethylene lip is a simple flat wafer type of washer or annulus, and to provide it with hydrodynamic action has involved additional steps in manufacture, e.g., machining or cold forming a configuration on the wafer. There are other occasions and materials when the use of a simple wafer-type seal is desirable.

An object of the present invention is to provide simple wafer-type oil seals with bidirectional hydrodynamic action. Another object is to do so without providing any special formation on the sealing lip.

Another object of the invention is to provide a bidirectional hydrodynamic polytetrafluoroethylene seal without any flutes.

Another object of the invention is to provide hydrodynamic action which is directly proportional to the rotational speed of the rotating element.

Another object of the invention is to provide a hydrodynamic seal operating in both directions, and not requiring any garter spring or similar element to maintain contact between the lip and the shaft or bore with which the lip is moving relatively.

Another object of the invention is to provide a seal with a rotating wafer lip that employs centrifugal force to help achieve it hydrodynamic action.

Some structures look somewhat like the structure of the present invention, but do not operate in the same manner. For example, German patent DE No. 3 031 870 is a grease seal of a type called in that patent a "cassette seal". Although it bears some superficial resemblance to the seal of the present invention, its action is quite different because the wafer lip is intended to exclude dirt rather than retain oil, because the lip is mounted on a stationary shaft, and is wiped by a rotating bore wall, and because the sealing edge faces the air side of the seal. The seal lip is not rotated and does not generate the centrifugal force which the present invention uses as an important element in both preventing seal leakage and in providing hydrodynamic return of any oil that might have been leaked. Moreover, a grease seal like that of this German patent is different in purpose from the oil seal of the present invention, for it is often desirable to flush grease through a grease seal when adding lubricant, whereas it is not desirable to flush oil through an oil seal.

Another grease-purgeable seal is shown in U.S. Pat. No. 4,106,781. There again, the seal is intended to exclude dirt and dust and other foreign matter and is also intended to permit the passage of the lubricant through the "seal". Again, the seal faces the air side rather than the grease side. It is not clear from that patent which element rotates, but it makes no difference, because centrifugal force is not employed to augment sealing action. Moreover, it is believed that it is intended to be a stationary cassette-type seal like that of the German patent.

SUMMARY OF THE INVENTION

This invention comprises a rotating-disc bidirectional hydrodynamic oil seal, for use between a shaft and a bore, one of which is a stationary member, the other of which is a rotating member. The purpose is to retain oil in an oil reservoir and return any leaked oil thereto.

The seal includes two basic members, one a stationary member or stator having a frustoconical portion with a lip-engaging surface on the side facing the shaft and the other, larger-diameter side facing toward the oil reservoir.

The other basic member is a rotating sealing assembly or rotor having a supporting portion for mounting it with a leak-tight fit on the machine's rotating member and supporting a flexible sealing lip. This lip extends radially outwardly and tends to assume a substantially radial position; it has an outer edge and first and second opposite faces. The first face engages the lip-engaging portion of the frustoconical portion, so that the lip is flexed thereby. The oil reservoir is functionally in communication with the lip's outer edge and its second face.

As a result of this structure, the centrifugal force of rotation of the rotating member in either direction tends to urge its first face snugly against the lip-engaging portion of the stator, so that oil is prevented from passage between the lip and the lip-engaging portion. In addition, any oil that might have passed between then is returned to the oil reservoir, so that the seal functions as a bidirectional hydrodynamic seal.

Typically, the sealing assembly or rotor is on a rotating shaft, and the frustoconical wear sleeve portion is in a stationary bore. However, the housing and its bore may be the rotating member and the shaft may be stationary. In either event, the flexible sealing lip extends radially outwardly and engages the frustoconical portion on the side of that portion that faces the shaft. Since rotation of the lip produces the hydrodynamic sealing function, it does not matter in which direction the rotating member rotates.

The lip is preferably of the wafer type and this makes polytetrafluoroethylene a suitable—and often preferable—material for the lip. The lip may be clamped in place on the sealing assembly or bonded to it. If clamped, there may be an additional sealing gasket at the clamp.

There may be some leakage during static conditions, but the hydrodynamic action during rotation generally returns the oil to the oil reservoir. Static leakage may be minimized by an annular bead on the lip.

Auxiliary lips may be provided to exclude foreign matter, and the seal may, if desired, be unitized with a wear sleeve.

Special lip-lubrication paths may also be provided.

DESCRIPTION OF SOME PREFERRED EMBODIMENTS

Figure 1:
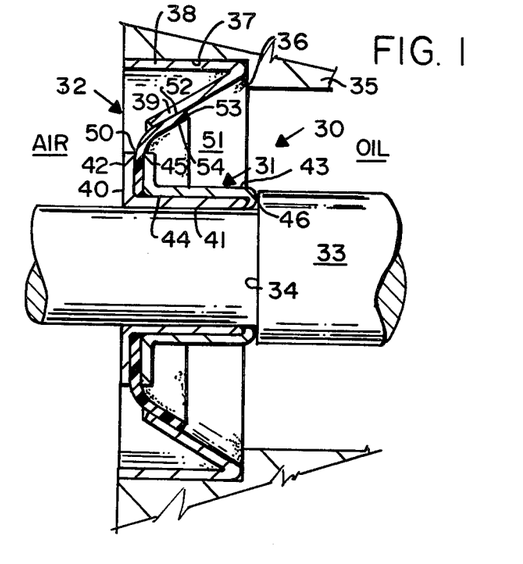
FIG. 1 is a view in elevation and in section of a shaft seal combination embodying the principles of the present invention, assembled between a rotating shaft and a stationary bore of a housing.
Figures 2, 7:
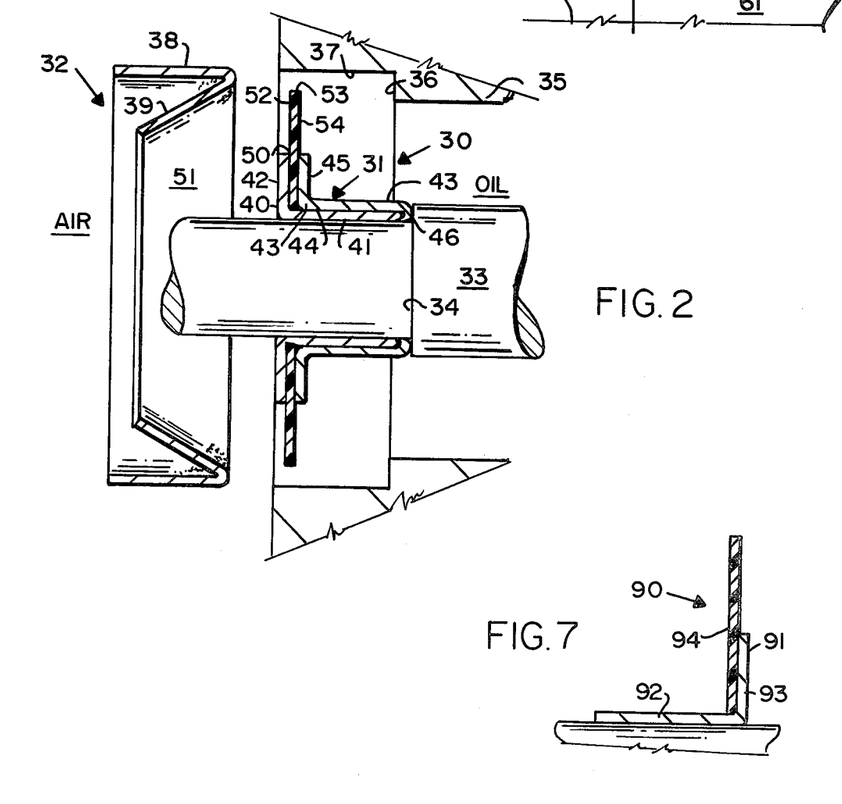
FIG. 2 is a view similar to FIG. 1 showing the rotor element of the seal of FIG. 1 mounted on the shaft with the stator element about to be installed and showing how the sealing element at this time assumes a radial position.
FIG. 7 is a view in elevation and in section of the upper portion of another modified form of sealing rotor in which the sealing washer is bonded directly to its supporting case.

A basic seal for use between a rotating shaft and a stationary bore (FIGS. 1 and 2)

FIG. 1 shows a shaft seal assembly 30 embodying the principles of the invention. Here, the assembly 30 has a rotor 31 and a stator 32. The rotor 31 is mounted on a rotating shaft 33, abutting a shoulder 34. This shaft 33 rotates in a stationary housing 35 having a shoulder 36 and providing a bore 37. In the bore 37 the stator 32 fits up against the shoulder 36 and has a cylindrical bore-engaging portion 38 and an inwardly turned wear-sleeve flange 39 extending radially inwardly at an angle. Although the stator 32 is illustrated as a member formed from sheet metal, it may, if desired be a machined member, or the housing bore properly machined.

The rotor 31 has a metal case member 40 with a cylindrical portion 41 firmly secured in a leak-tight press fit on the shaft 33 and also having a radially outwardly extending portion 42. A second case member 43 with a cylindrical portion 44 fitting snugly against the portion 41 and with a radial portion 45. The case members 40 and 43 are clamped together, as by the curled over end 46, so that between the radial portions 42 and 45 is clamped a seal lip or disc 50, preferably made from polytetrafluoroethylene.

The lip or disc 50 comprises a simple annular washer of uniform wafer thickness; the lip 50 normally extends in a radial plane, as shown in FIG. 2. However, when the stator 32 is installed in its position shown in FIG. 1, the lip 50 is flexed and comes against a lip-engaging or disc-engaging surface 51 of the wear sleeve flange 39. The oil side of the installation is to the right of FIG. 1, so that the wafer lip 50 is flexed toward the oil side. It then has a wear-sleeve engaging face 52, a square end 53, and a radially inner face 54 which does not engage the wear sleeve surface 51.

Rotation of the shaft 33 and the rotor 31 results in centrifugal force which, together with the natural tendency of the lip 50 to regain its radial shape, increases the degree of sealing contact with the frustoconical wear sleeve surface 51. Oil that has leaked past the lip 50 tends to be flung out and to work its way radially outwardly along the stator surface 51 and under the lip surface 52 and to flow back to the oil side of the seal. Thus, the seal 30 is hydrodynamic, although its lip 50 has no flutes or similar configurations to provide this hydrodynamic action. Moreover, the seal 30 is effective particularly during rotation because of the tendency of the lip 50 to snugly engage the stator's wear sleeve surface 51.

Figure 3:
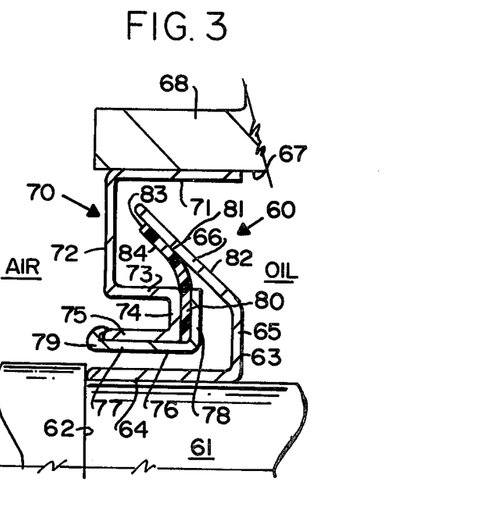
FIG. 3 is a similar view of an upper portion of a shaft seal installation also embodying the principles of the present invention, in which the bore rotates along with the seal rotor, and the stator is mounted on a stationary axle.

A seal of the invention for use with a rotating bore and a stationary shaft (FIG. 3)

A seal assembly 60 shown in FIG. 3 seals between a stationary shaft or axle 61 having a shoulder 62 against which abuts the end of a stator 63. The stator 63 has a cylindrical portion 64 mounted in a leak-tight fit on the shaft or axle 61, which may be a trailer axle, for example. The stator 62 also has a radially outwardly extending portion 65 followed by a radially outwardly angularly extending lip engaging wear-sleeve portion 66.

In a bore 67 of a rotating housing 68 is seated a rotor case member 70 which has a cylindrical portion 71 snugly engaging the bore 67 in a leak-tight fit, a radially inwardly extending portion 72, a second cylindrical portion 73 parallel to portion 71, and a clamping radial portion 74 leading to a third cylindrical portion 75 extending in the opposite direction from the portion 73. The clamp is completed by use of another metal case member 76 having a cylindrical portion 77 snugly engaging the third cylindrical portion 75 and a radial clamping portion 78 parallel to the radial clamping portion 74. The free end 79 of the cylindrical portion is rolled over to join the two case portions 70 and 76 and to clamp between them a seal lip 80 which is preferably made from polytetrafluoroethylene.

The lip 80 has a face 81 that engages a surfaces 82 of the wear sleeve portion 66, as well as an outer edge 83 and a second face 84.

It is important for the rotation of the rotor 70 to result in centrifugal force that will help to retain oil in the oil reservoir, which is on the right side of the seal 60 in FIG. 3, and to return leaked oil thereto. Here again, centrifugal force acts in conjunction with the natural force of the lip 80 resulting from its tending to resume its original radial shape, and these two forces hold the lip surface 81 tightly against the stator wear sleeve 66 and prevent oil from the oil side on the right of the seal from getting past the seal 60, while returning oil that may have leaked past it, if for example, the bore 65 were scratched. Thus, the seal of this invention can be used with a rotary bore as well as with a rotary shaft.

Figure 4:
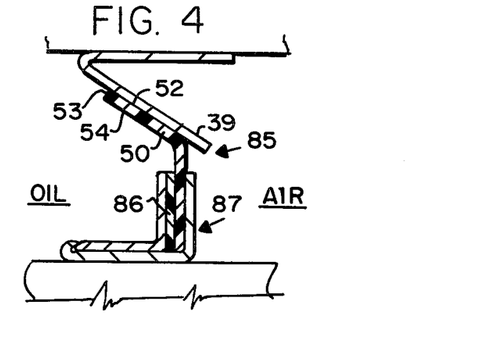
FIG. 4 is a view of the upper part of a shaft seal installation, somewhat simplified, showing a seal structure resembling that of FIG. 1, through slightly modified. The seal is shown at or near the time of its installation when it has a new square tip.
Figure 5:
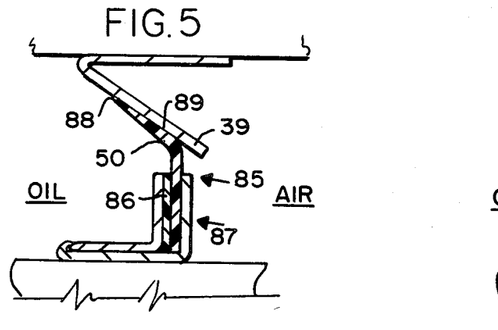
FIG. 5 is a view similar to FIG. 4 showing the seal of FIG. 4 after a long period of wear has produced a feathered tip.
Figure 6:
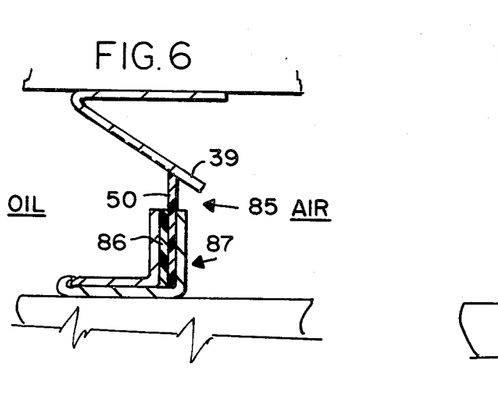
FIG. 6 is another view like those of FIGS. 4 and 5 in which the seal of FIG. 4, after prolonged use, is almost worn out, but is still performing its sealing function.

The effect of wear on the seal (FIGS. 4, 5, and 6)

FIGS. 4, 5, and 6 show a modified form of sealing assembly 85 according to the invention in which there is a sealing gasket 86 in addition to the other members of a rotor 87 helping to prevent leakage. Otherwise, the numerals used in FIGS. 1 and 2 apply. The main purpose of these views is to show how wear acts on the lip 50. In this instance, the oil reservoir is to the left and the air side is to the right. FIG. 4 shows the seal assembly 85 at the beginning of installation with the lip 50 having a square end 53, and with its thickness constant between the two faces 52 and 54.

FIG. 5 shows the seal assembly 85 at a later stage, usually many thousands of miles later, in an automotive installation, for example, The lip 50 has become worn and feathered so that it is now thinnest at an outer edge 88 and with increasing thickness along a face 89 in toward the shaft (because the centrifugal force is largest at the largest diameter). This still provides the desired centrifugal force and the desired hydrodynamic action.

FIG. 6 shows the seal assembly 85 with the lip 50 nearly worn out but still functioning properly, though with less hydrodynamic action than before. However, that action is still there because the centrifugal forces acts on the sealing element and still acts to send the oil up the inclined surface 52 of the wear sleeve 39.

Some modified forms of seal structure (FIGS. 7–10)

FIG. 7 shows a modified form of sealing rotor 90 embodying the invention, in which the rotor 90 is provided by a simple one-piece metal case 91 with a cylindrical portion 92 and a radial flange 93 to which a polytetrafluoroethylene lip 94 is directly bonded The sealing lip 94 may be cut as a flat wafer.

Figure 8:
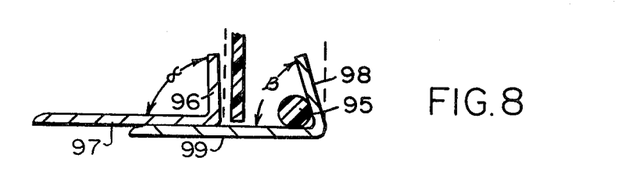
FIG. 8 is a similar view of another modified form of the invention, in which an anti-leak O-ring is about to be clamped in place to prevent leakage through the case.

FIG. 8 shows a clamping structure like that of FIG. 1 but in which an anti-leak O-ring 95 is about to be clamped in the assembly to serve as a gasket. A Belleville washer effect is obtained by having a generally radial flange 96 of the left hand clamping element extend at slightly less than a right angle to its cylindrical portion 97 at $\alpha$ while the other radial flange 98 makes an even smaller angle with its cylindrical portion 99 at $\beta$.

Figure 9:
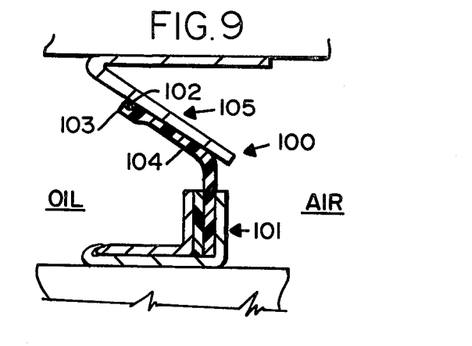
FIG. 9 is a view in elevation and section of the upper half of an installation embodying the principles of the invention in a modified form, with a rubber bead at the outer extremity of the flexed lip to preclude static leakage.

FIG. 9 shows a seal assembly 100 with a static-seal enhancing structure. A rotor 101 generally like that of FIG. 4 is provided in addition with a rubber bead 102 near the outer extremity 103 of a sealing lip 104. This rubber bead 102 may be bonded to a stator 105, and it enhances the static seal, which otherwise might be less than perfect in some installations.

Figure 10:
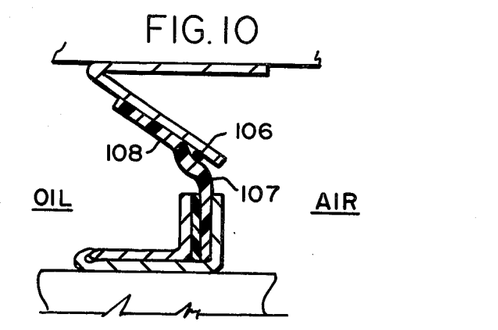
FIG. 10 is a similar view of another static-seal-enhancing device in which the rubber bead is at the inner end of the flexed portion of the lip.

A similar structure is shown in FIG. 10 where there is a rubber bead 106 at the opposite end 107 of the flexed portion of a lip 108.

Figure 11:
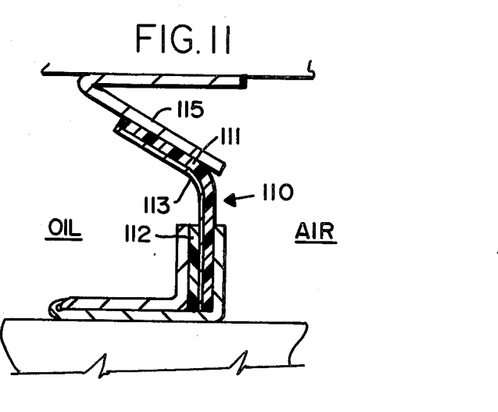
FIG. 11 is a similar view of another modified form of the invention in which the wafer element is protected from stretch by shim stock material backing up and restraining the elastomeric wafer.

Prevention of excessive rotary stretching (FIG. 11)

At high speeds of rotation a polytetrafluoroethylene lip may tend to stretch excessively, and this reduces its effectiveness, or may even tend to rupture at extreme speeds. As FIG. 11 shows, this may be overcome by an assembly 110 clamping in between a polytetrafluoroethylene lip 111 and a similar silicone rubber gasket 112, a shim stock annulus 113 which is bonded on both sides, so that one side is bonded to the silicone rubber gasket 112 and the other side is bonded to the polytetrafluoroethylene lip 111. The shim stock annulus 113 extends outwardly along the full extent of the polytetrafluoroethylene lip 111, backing it up and preventing any deformation such as excessive stretch or rupture. The shim stock annulus 113 may have to be partially performed after bonding, and before assembly with the wear ring 115 in order to insure that there will be no deleterious wrinkling.

Figure 12:
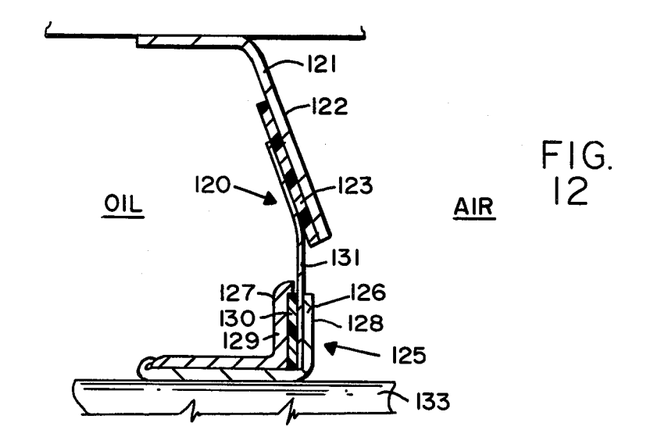
FIG. 12 is a similar view of another modified form of the invention for use in very high speed operation, in which the rotary lip is itself shim stock clamped into the rotor case, and the stator includes a polytetrafluoroethylene wear pad.
Figure 13:
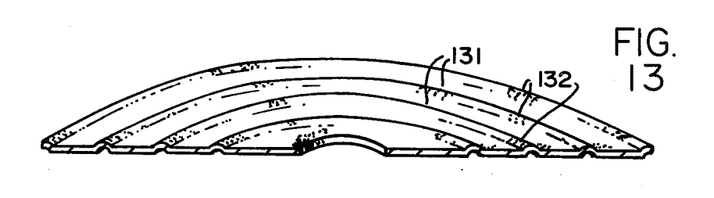
FIG. 13 is a fragmentary view partly in section and in perspective of a modification of a portion of the shim stock before installation.

A seal for very high speed operation (FIGS. 12 and 13)

Another modified form of seal assembly 120 is shown in FIGS. 12 and 13. Here a stator 121 has an angularly extending wear sleeve member 122 which is bent in the opposite direction from those previously considered, and is provided with a polytetrafluoroethylene reaction wear pad 123 that is bonded to the wear sleeve 122. The member 123, of course, remains stationary. The air side in this embodiment is to the right and the oil side to the left. A rotor 125 includes two case members 126 and 127 with their radial flanges 128 and 129 clamping between them a gasketing silicon wafer 130 to which is bonded a preformed semi-flexible annulus 131 of shim stock. As shown in FIG. 13, the shim-stock annulus 131 may be provided with concentric ridges 132 to help maintain stiffness and to prevent circumferential wrinkles when it is deflected. The angle between the annular 121 and the shaft 133 is closer to a right angle than with the seal lips heretofore shown, because here it is important to prevent wrinkling, and one of the ways of doing that is to have much less deflection. The deflection may be only a few thousandths of an inch so that the shim-stock annulus 131 approaches a flat state.

Figure 14:
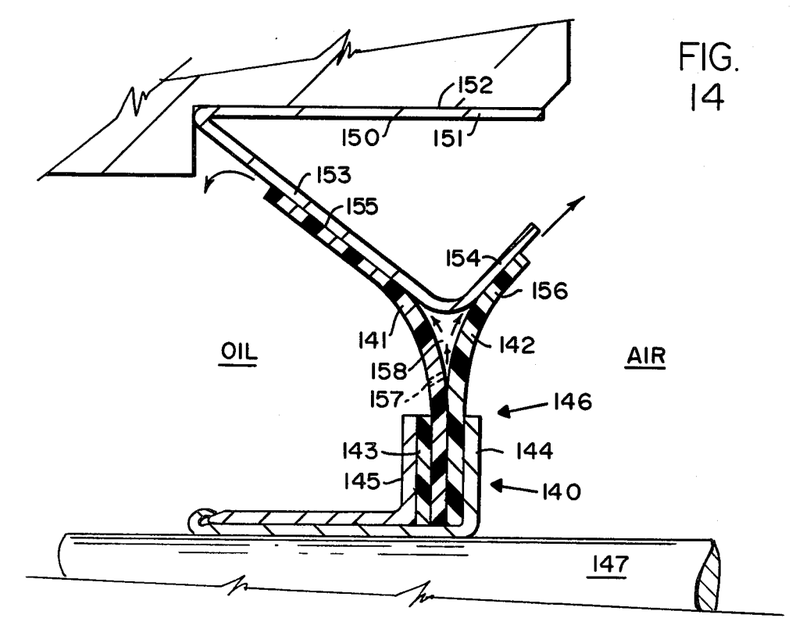
FIG. 14 is a view in elevation and in section of another modified form of seal embodying the principles of the invention, having a dual lip structure and a modified form of wear sleeve.

A dual lip seal of the invention (FIG. 14)

FIG. 14 shows another seal assembly 140 embodying the invention with the oil side of the seal to the left and the air side to the right. Here it is desired to prevent the entry of foreign matter, which may be dirty water or dirt, for example. In this instance there are two sealing wafer lips 141 and 142 both preferably of polytetrafluoroethylene, and clamped along with a leak-preventing gasket 143 between two case members 144 and 145 substantially as shown earlier, to make up a rotor 146 that is mounted on a rotating shaft 147. A stator 150 is of a different form that those shown previously, having not only a cylindrical portion 151 engaged in a bore 152 and an angularly extending wear-sleeve portion 153, but also a reversed portion 154 turning at about 90° from the portion 153 to extend for a short distance outwardly at an angle and providing a second wear sleeve. The angles of each may be about 45°. The oil-retaining lip 141 may be longer than the dirt-excluding lip 142, and it has a sealing surface 155. The dirt-excluding lip 142 is basically the same in idea and structure and has a face 156 engaging the second wear sleeve portion 154 of the stator 150. Both lips 141 and 142 act in the manner appropriate to them.

In this structure it is also possible and often desirable to include an orifice 157 in the oil sealing lip 141 so that oil can enter into a space 158 between the two lips 141 and 142 to assure that both of the lips will be lubricated, thereby reducing wear. Some oil may be lost, but not much and it helps to prevent the entry of dirt into the system.

Figures 15, 17:
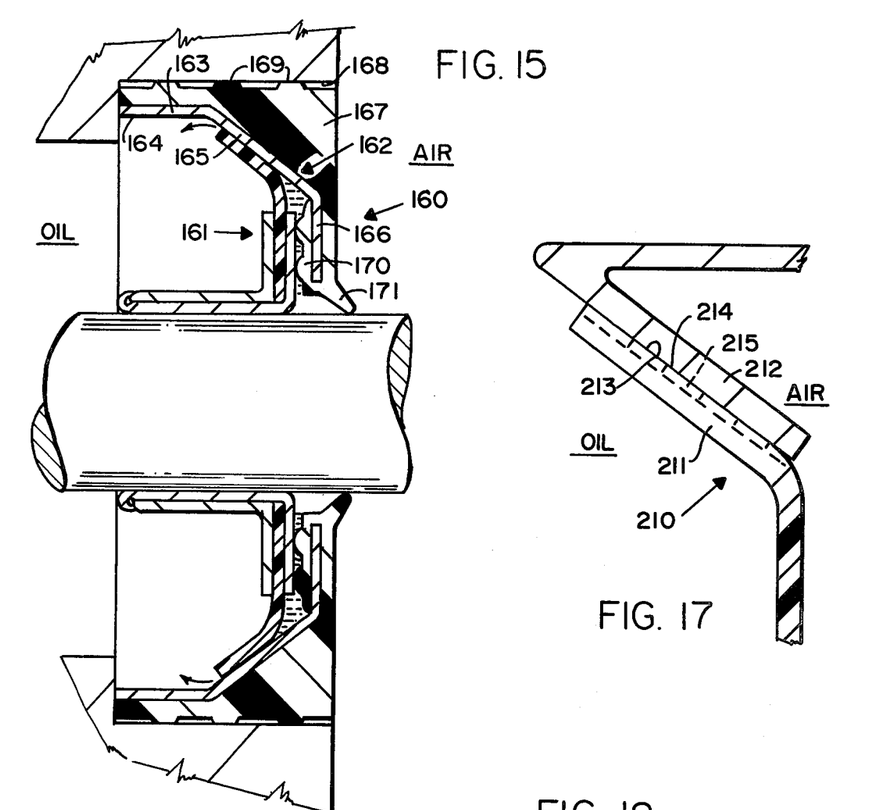
FIG. 15 is a view similar to FIG. 1 of another modified form of seal embodying the principles of the invention, having a sealing rotor like that of FIG. 1, but a stator that is different and includes an elastomeric portion engaging the bore and also an auxiliary dirt-excluding lip engaging the rotating shaft.
FIG. 17 is a fragmentary view in elevation and in section of a sealing device embodying the principles of the invention, having flow channels to establish an oil film for cooling so that the seal can act as a high-interference hydrodynamic seal.

Another dirt-excluding seal (FIG. 15)

A seal assembly 160 shown in FIG. 15 includes as its rotor 161 a member exactly like the rotor 31 of FIG. 1. Its stator 162 is different, comprising a metal case 163 having a cylindrical portion 164, an angularly extending lip-engaging portion 165, and a radially extending portion 166. On the outer surface of all three of these portions 164, 165, and 166 is bonded an elastomeric member 167 which makes the sealing engagement with a bore 168, preferably at a series of cylindrical ring portions 169 which are larger in diameter than the bore 168 and are somewhat compressed, with some flow of rubber, when the seal stator 162 is installed. On the inner surface of the stator 162, a series of buttons 170 maintain the proper distance between the rotor 161 and the stator 162. Radially extending, but at an angle, is a auxiliary lip 171 to exclude dirt and other foreign matter.

Figure 16:
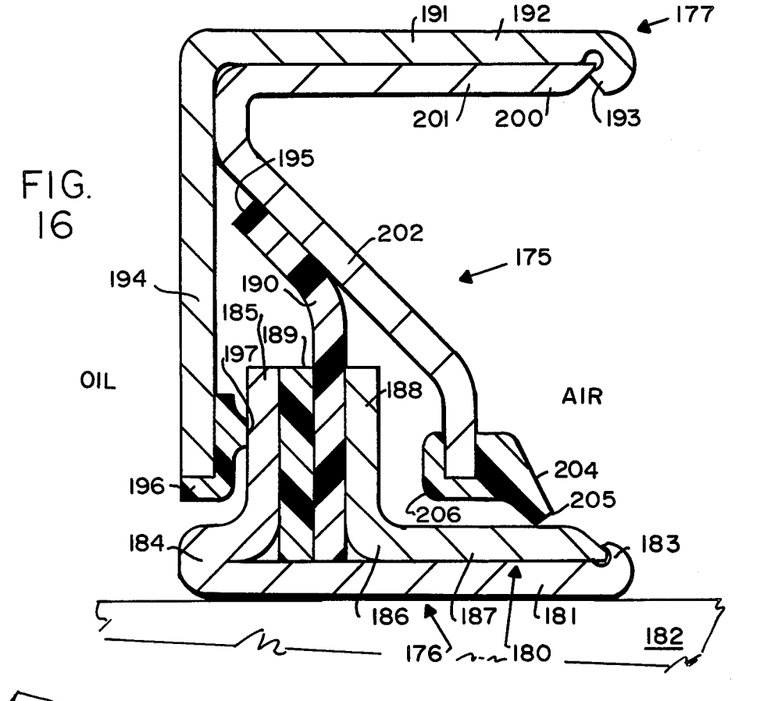
FIG. 16 is a view in elevation and in section of the upper half of another form of unitized seal embodying the principles of the invention and also including a dirt-excluding lip.

A unitized seal of the invention (FIG. 16)

FIG. 16 shows a unitized seal assembly 175 of the invention having a rotor 176 and a stator 177. The rotor 176 has a main case member 180 having a cylindrical portion 181 that fits on a shaft 182. There is a free end 183, and an end portion 184 which is bent back upon the cylindrical portion 181 to provide an inset from which extends out a radial flange 185. Another case member 186 has a cylindrical flange 187 that rests against the outer surface of the cylindrical flange 181 and a clamping radial flange 188. Between them are clamped a sealing gasket 189 and a polytetrafluoroethylene lip 190, the free end 183 being curled over to hold the case members 180 and 186 together.

The stator includes a bore-engaging case member 191 having a cylindrical flange 192 with a free end 193 and a radially inwardly extending flange 194 that goes down well past the outer end 195 of the sealing lip and extends opposite the clamping flanges 185. The flange 194 is provided with an elastomeric annulus 196 which provides a series of spacing buttons 197 to space the two flanges 185 and 194 apart, and in between successive buttons 197 is plenty of room for oil to pass through. The oil side of this seal 175 is to the left, and the air side lies to the right.

Clamped in place by curling over the free edge 193 is an inner case member 200, having a cylindrical portion 201 nested against the cylindrical portion 192 of the case member 191, and having an angularly inwardly extending wear sleeve portion 202. A at the inner end of the wear sleeve portion 201 and basically parallel to the clamping flange 188, is a radially inwardly extending portion 203 to which is molded and bonded a dirt-excluding elastomeric member 204 having a lip 205 which runs on the inner cylindrical surface 187 of the case member 186, and is provided on its axially opposite side with a series of buttons 206 generally like those on the member 196 to assure proper spacing. In assembly, the rotor 176 and the bore-engaging case member 191 of the stator 177 are put in place, and then the outer case member of the stator is put over and the end 193 curled to lock the entire seal together. It can then be installed as a unitized seal.

Figures 18, 19:
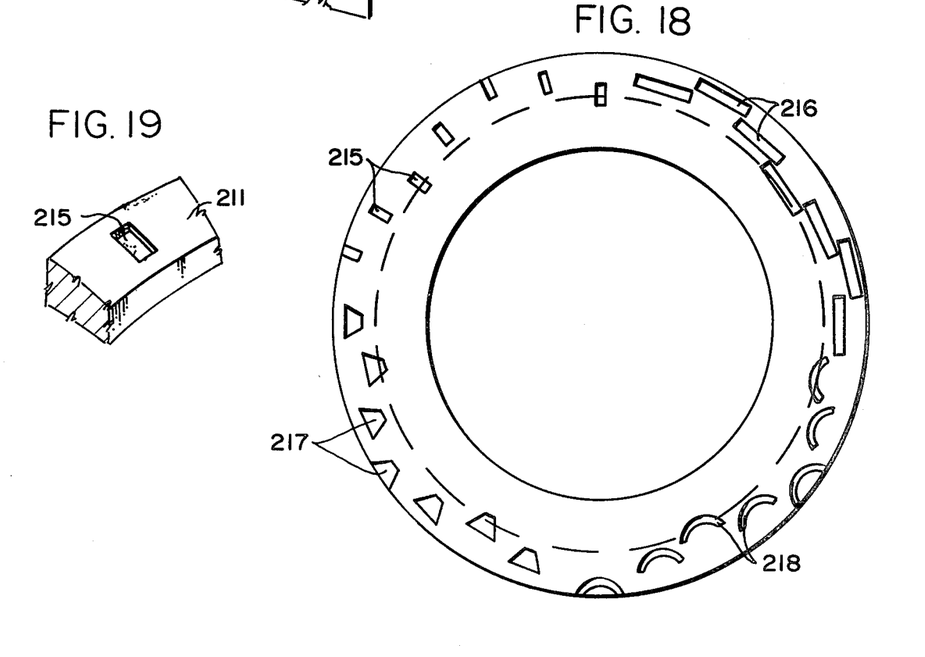
FIG. 18 is a view in end elevation of the seal of FIG. 17, showing four different forms of interrupted channels, one in each quadrant, each illustrative of how the device can be made with any one such type of channel.
FIG. 19 is an enlarged view in perspective of a portion of FIG. 18.

Float channels for reduced cylindrical force giving low speed hydrodynamic action (FIGS. 17-19)

FIG. 17 shows in a fragmentary view a portion of a rotor 210 which has a polytetrafluoroethylene lip member 211 in engagement with a stator wear sleeve 212. The air side is to the right and the oil side to the left in this view. Into a surface 213 of the lip which engages a wear sleeve surface 214, a series of interrupted channels 215 are provided. These are pocket-like members that do not go all the way through the lip 211, but which pick up or are initially supplied with lubricant so as to prevent static leaks and enhance the radially outward fluid flow during low speed operation when the centrifugal force is reduced. These channels 215 could be in the static surface instead of the rotating surface if desired, and, again if desired there could actually be holes going all the way through the rotor in its stator-contacting area only, to provide fluid film regeneration, if that is necessary in a particular installation.

FIG. 18 shows some of the configurations that may be used for the interrupted channels. Channels 216 in the upper right quadrant are long pockets, short in radial and long in circumferential extent. The upper left quadrant shows slots 215 of a longer extent radially and shorter widthwise. The lower left hand quadrant shows trapezoidal ones 217, and the lower right hand quadrant shows arcuate slots 218, all of them staggered in radial location so that oil can cover the rest of the surface.

Figure 20:
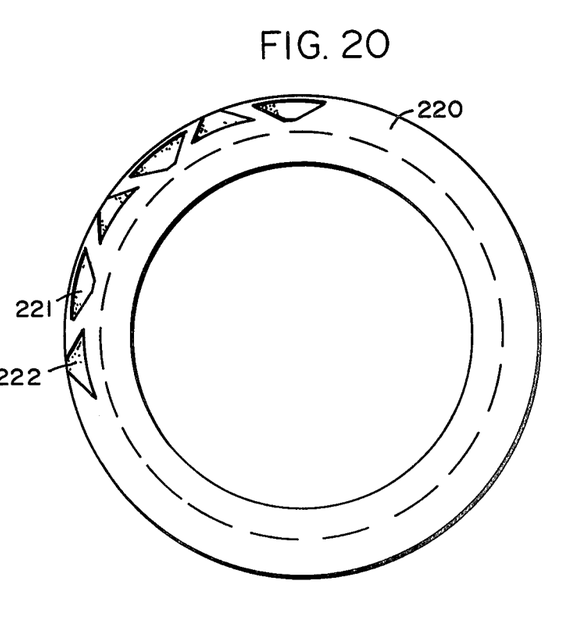
FIG. 20 is a view in end elevation of a seal element embodying the principles of the invention, showing patterns on the rotor lip to regenerate the oil film on the rotor seal.
Figure 21:
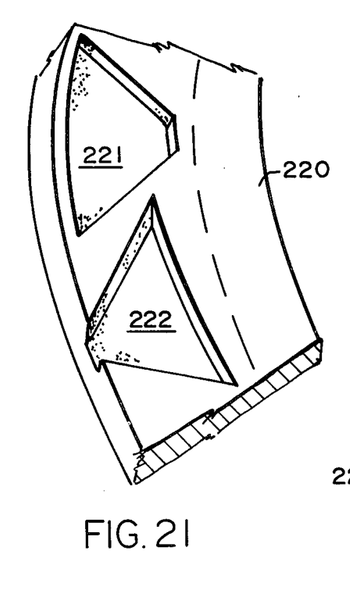
FIG. 21 is an enlarged fragmentary view in perspective of a portion of FIG. 20.

Rotor patterns to regenerate oil films on rotor seals
(FIGS. 20 and 21)

FIGS. 20 and 21 show a rotor sealing lip 220 having a series of trapezoidal members 221 and 222 reversed with respect to each other to direct the oil inwardly in some instances, and outwardly in others, and thereby assure the presence of an oil film while still obtaining the desired hydrodynamic action.

To those skilled in the art to which this invention relates, many changes in construction and widely differing embodiments and applications of the invention will suggest themselves without departing from the spirit and scope of the invention. The disclosure and the descriptions herein are purely illustrative and are not intended to be in any sense limiting. For example, the fluid sealed need not be oil, and the "air" side may free another fluid than air; for instance the seal may seal clean water from dirty water. Both the terms "oil" and "air" are used in the claims in an exemplary rather than definatory manner.

What is claimed is:

1. A rotating-disc bidirectional hydrodynamic oil seal, for use between a shaft and a housing bore, one of which is a stationary member, the other of which is a rotating member, to retain oil in an oil reservoir, including in combination:
    a rigid member having a peripheral frustoconical portion extending toward said rotating member and having a disc-engaging surface on the side facing said rotating member, and
    a sealing assembly having a supporting portion for mounting with a leak-tight fit on said rotating member and supporting a flexible sealing disc that extends radially outwardly and tends to assume a substantially radial position, said disc having an outer edge and first and second opposite faces, said first face engaging and flexed by said disc-engaging surface, the oil in said reservoir being functionally in communication with at least a portion of said outer edge and said second face,
    the centrifugal force of rotation of said rotating member in either direction tending to urge said first face more snugly against said disc-engaging portion, so that oil is effectively prevented from passing out between said disc and said disc-engaging portion and any oil that may have so passed tends to be returned to said oil reservoir.

2. The seal of claim 1 wherein said disc comprises a flat washer-like annulus held by said supporting portion.

3. The seal of claim 2 wherein said annulus is polytetrafluoroethylene.

4. The seal of claim 2 wherein said supporting portion includes clamping means for clamping said annulus so as to hold it.

5. The seal of claim 4 having gasket means between said annulus and said supporting portion on the oil-reservoir side of said sealing assembly.

6. The seal of claim 2 having bonding means for bonding said annulus to said supporting portion.

7. The seal of claim 2 wherein said rigid member includes a portion having an elastomeric member extending into sealing contact with said rotating member.

8. The seal of claim 7 wherein said rigid member also includes elastomeric spacing means for providing lubricant passage to said disc.

9. The seal of claim 7 wherein said rigid member includes a portion having an elastomeric member extending into sealing contact with said supporting portion.

10. The seal of claim 9 wherein said rigid member also includes elastomeric spacing means for providing lubricant passage to said disc between said elastomeric member's sealing contact and first face.

11. The seal of claim 2 having a circular elastomer bead between the radially outer extremity of said first face and said disc-engaging surface.

12. The seal of claim 2 having a circular elastomeric bead between the radially inner extremity of said first face and said disc-engaging surface.

13. The seal of claim 2 having a metal shim-stock annulus engaged with said second face and carried by said supporting portion for helping to prevent stretch of said annulus during high rotational speed operations.

14. The seal of claim 2 wherein said annulus is made of metal shim-stock and said disc-engaging face includes an elastomeric pad bonded to said wear sleeve portion and in engagement with said first face.

15. The seal of claim 1 wherein said wear-sleeve portion is followed by a second, oppositely inclined wear-sleeve portion with a second disc-engaging surface on its side facing said shaft and said sealing assembly comprises two lips, namely first and second annuli both held by said supporting portion and flexed in opposite directions by the two wear sleeve portions, each said disc-engaging portion being wiped by one said face of one said lip, to provide an oil-retaining seal effected by the first lip engaging the first disc-engaging portion and a dirt-excluding lip engaging the second disc-engaging portion.

16. The seal of claim 15 wherein both said annuli are of constant-thickness polytetrafluoroethylene.

17. The seal of claim 15 wherein said annuli are both clamped to said supporting portion by clamping portions of said supporting portion.

18. The seal of claim 17 including gasket means between said first said lip and the supporting portion.

19. The seal of claim 17 having an orifice through said oil-retaining lip of said sealing member radially beyond said supporting portion to provide lubricant for both said lips.

20. The seal of claim 1 wherein said second face has a circumferential series of channels thereon, staggered radially to provide overlap.

21. The seal of claim 1 having on said first face a series of ribs and recesses for additional hydrodynamic action.

22. A rotating-lip bidirectional hydrodynamic oil seal for use between a stationary housing bore and a rotating shaft to retain oil in an oil reservoir, including in combination:

a rigid stationary case member having an outer peripheral bore-engaging portion and a radially-inwardly directed frustoconical portion having a lip-engaging surface on the side facing the shaft, and a sealing assembly having an inner shaft-engaging portion supporting an outwardly extending flexible sealing lip that tends to assume a substantially radial position, said lip having an outer edge and first and second opposite faces, said first face engaging and being flexed by said lip-engaging portion, the oil reservoir being functionally in direct communication with the outer edge and with said second face, the centrifugal force of rotation of said sealing assembly in either direction tending to increase the forces urging said first face against said lip-engaging portion, so that oil is prevented from passing between said lip and said lip-engaging portion.

23. The seal of claim 22 wherein said lip comprises a flat washer-like annulus held by said supporting portion.

24. The seal of claim 23 wherein said annulus is polytetrafluoroethylene.

25. The seal of claim 22 wherein said rigid case member has an elastomeric member extending into sealing contact with said rotating member.

26. The seal of claim 25 wherein said rigid case member also includes elastomeric spacing means for providing lubricant passage to said lip.

27. The seal of claim 22 wherein said rigid case member has an elastomeric member extending into sealing contact with said shaft-engaging portion.

28. The seal of claim 1 wherein said rigid case member also includes elastomeric spacing means for providing lubricant passage to said lip between said elastomeric member's sealing contact and first face.

29. The seal of claim 22 wherein said frustoconical portion is followed by a second, oppositely inclined frustoconical portion with a second lip-engaging surface on its side facing said shaft and said sealing assembly comprises two lips, namely first and second annuli both held by said shaft-engaging portion and flexed in opposite directions by the two frustoconical portions, each said lip-engaging portion being wiped by one side face of a said lip, to provide an oil-retaining seal effected by the first lip engaging the first lip-engaging portion and a dirt-excluding lip engaging the second lip-engaging portion.

30. The seal of claim 29 wherein both said annuli are of constant-thickness polytetrafluoroethylene.

31. The seal of claim 30 wherein said annuli are both clamped to said supporting portion by clamping portions of said shaft-engaging portion.

32. The seal of claim 31 including gasket means between said first said lip and the supporting portion.

33. The seal of claim 30 having an orifice through said oil-retaining lip of said sealing assembly radially beyond said shaft-engaging portion to provide lubricant for both said lips.

34. The seal of claim 22 wherein said second face has a circumferential series of channels thereon, staggered radially to provide overlap.

35. The seal of claim 22 having on said first face a series of ribs and recesses for additional hydrodynamic action.

36. A rotating-lip bidirectional hydrodynamic oil seal for use between a stationary shaft and a rotating housing bore, to retain oil in an oil reservoir, including in combination:

a rigid stationary case member having an inner peripheral shaft-engaging portion and a radially-outwardly directed frustoconical portion having a lip-engaging surface on the side facing the shaft, and a sealing assembly having an outer bore-engaging portion and a radially inwardly extending portion with an inner cylindrical portion supporting a flexible sealing lip that extends radially outwardly and tends to assume a substantially radial position, said lip having an outer edge and first and second opposite faces, said first face engaging and being flexed by said lip-engaging portion, the oil reservoir being functionally in communication with said outer edge and with said second face, the centrifugal force of rotation of said sealing assembly in either direction tending to increase the forces urging said first face against said lip-engaging portion, so that oil is prevented from passing out from between said lip and said lip-engaging portion.

37. The seal of claim 36 wherein said lip comprises a flat washer-like annulus held by said bore-engaging portion.

38. The seal of claim 37 wherein said annulus is polytetrafluoroethylene.

39. The seal of claim 37 wherein said supporting portion includes clamping means for clamping said annulus so as to hold it.

* * * * *

UNITED STATES PATENT AND TRADEMARK OFFICE
CERTIFICATE OF CORRECTION

PATENT NO. : 4,484,752

DATED : November 27, 1984

INVENTOR(S) : Gustavus A. Bentley

It is certified that error appears in the above-identified patent and that said Letters Patent is hereby corrected as shown below:

Column 2, line 3, "achieve it" should read "it achieve".

Column 2, line 62, "then" should read "them".

Column 3, line 41, "through" should read "though".

Column 5, line 35, delete "62" and insert "63".

Column 5, line 53, "surfaces" should read "surface".

Column 5, line 66, after "bore" delete "65" and insert "67".

Column 6, line 16, after "for example" delete "," and insert ".".

Column 6, line 34, after "bonded" insert ".".

Column 7, line 1, after "partially" delete "performed" and insert "preformed".

Column 7, line 22, after "annular" insert "stator".

UNITED STATES PATENT AND TRADEMARK OFFICE
CERTIFICATE OF CORRECTION

PATENT NO. : 4,484,752

DATED : November 27, 1984

INVENTOR(S) : Gustavus A. Bentley

It is certified that error appears in the above-identified patent and that said Letters Patent is hereby corrected as shown below:

Column 7, line 41, "that" should read "than".

Column 8, line 41, delete "A at" and insert "At".

Signed and Sealed this

Twenty-second Day of October 1985

[SEAL]

Attest:

DONALD J. QUIGG

Attesting Officer

Commissioner of Patents and Trademarks—Designate